United States Patent
Arning et al.

(10) Patent No.: US 9,058,505 B2
(45) Date of Patent: Jun. 16, 2015

(54) PROVIDING ACCESS CONTROL FOR PUBLIC AND PRIVATE DOCUMENT FIELDS

(71) Applicant: International Business Machines Corporation, Armonk, NY (US)

(72) Inventors: Andreas Arning, Tuebingen (DE); Andrea E. Baader, Boeblingen (DE); Thomas Schulze, Aidlingen (DE); Sascha Schwarze, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/927,597

(22) Filed: Jun. 26, 2013

(65) Prior Publication Data

US 2014/0373177 A1    Dec. 18, 2014

Related U.S. Application Data (63) Continuation of application No. 13/920,120, filed on Jun. 18, 2013.

(51) Int. Cl.
*G06F 7/00*    (2006.01)
*G06F 21/62*    (2013.01)

(52) U.S. Cl.
CPC .................................. *G06F 21/6218* (2013.01)

(58) Field of Classification Search
CPC ................................................. G06F 21/6218
USPC ............................................................ 726/28
See application file for complete search history.

(56) References Cited

U.S. PATENT DOCUMENTS

| | | | |
|---|---|---|---|
| 7,664,751 B2 * | 2/2010 | O'Sullivan et al. | 707/783 |
| 7,874,013 B2 * | 1/2011 | Kaminaga et al. | 726/28 |
| 8,510,846 B1 * | 8/2013 | Gunnarson et al. | 726/26 |
| 2003/0093409 A1 * | 5/2003 | Weil et al. | 707/3 |
| 2006/0080316 A1 * | 4/2006 | Gilmore et al. | 707/9 |
| 2007/0056034 A1 * | 3/2007 | Fernstrom | 726/20 |
| 2007/0162417 A1 * | 7/2007 | Cozianu et al. | 707/1 |
| 2007/0255698 A1 * | 11/2007 | Kaminaga et al. | 707/3 |
| 2010/0198804 A1 * | 8/2010 | Yaskin et al. | 707/706 |
| 2010/0229086 A1 * | 9/2010 | Howell et al. | 715/273 |
| 2012/0078883 A1 * | 3/2012 | Melby | 707/722 |
| 2014/0032926 A1 * | 1/2014 | Prem et al. | 713/189 |

FOREIGN PATENT DOCUMENTS

EP      2352103 A1    3/2011

OTHER PUBLICATIONS

Chatvichienchai et al.; "Bring Precision and Access Control to Business Document Search", Ninth ACIS International Conference on Software Engineering, Artificial Intelligence, Networking, and Parallel/Distributed Computing, 978-0-7695-3263-9/08 $25.00 © 2008 IEEE, pp. 557-562, DOI 10.1109/SNPD.2008.163.

(Continued)

*Primary Examiner* — Joseph P Hirl
*Assistant Examiner* — Sayed Beheshti Shirazi
(74) *Attorney, Agent, or Firm* — Isaac J. Gooshaw (57) ABSTRACT

A computer determines, based on a degree of authorization of a user, that a user has authorization to view a type of field. Based on the degree of authorization of the user, the computer generates a modified list of search terms by adding additional search terms to a list of search terms. The computer executes a search using the modified list of search terms. The computer identifies a search result that includes the first type of field which further includes a search term that is included in the modified list of search terms.

20 Claims, 5 Drawing Sheets

(56) References Cited

OTHER PUBLICATIONS

Chieu et al.; "Document Access in a Multi-Party Information Management System", 978-1-4244-2013-1/08 © 2008 IEEE, pp. 806-811.

Chieu et al.; "Secure Search of Private Documents in an Enterprise Content Management System", pp. 105-112, IEEE International Conference on e-Business Engineering, 0-7695-3003-6/07 $25.00 © 2007 IEEE, DOI 10.1109/ICEBE.2007.80.

U.S. Appl. No. 13/920,120, entitled "Providing Access Control for Public and Private Document Fields", filed Jun. 18, 2013.

\* cited by examiner

PROVIDING ACCESS CONTROL FOR PUBLIC AND PRIVATE DOCUMENT FIELDS

CROSS REFERENCE TO RELATED APPLICATION

This application is a continuation of U.S. patent application Ser. No. 13/920,120 filed on Jun. 18, 2013 the entire content and disclosure of which is incorporated herein by reference.

FIELD OF THE INVENTION

The present invention relates generally to the field of access control of information, and more particularly to controlling the access of information using a common search index for both public and private fields.

BACKGROUND OF THE INVENTION

Document management systems allow users to create centralized repositories, or libraries, containing all of the data they generate, such as information stored in documents, spreadsheets, text files, electronic mail, multimedia, etc. Powerful search and retrieval tools make this information easily available for use and collaboration across the entire enterprise. In certain instances, a user may require that a certain document or other electronic file not be widely disseminated or that the document have restricted access.

The widespread dissemination of electronic documents across the world wide web and other wide area networks or metropolitan area networks has complicated not only the management and integration of access control systems but also the types of access that are to be granted to particular users. For example, users from different organizations that are collaborating on a particular project may desire access to each other's electronic documents, but the access control lists and associated processes and access privileges may be incompatible and prove difficult to harmonize.

SUMMARY

Embodiments of the present invention provide a method to control access to information. A computer determines, based on a degree of authorization of a user, that a user has authorization to view a type of field. Based on the degree of authorization of the user, the computer generates a modified list of search terms by adding additional search terms to a list of search terms. The computer executes a search using the modified list of search terms. The computer identifies a search result that includes the first type of field which further includes a search term that is included in the modified list of search terms.

DETAILED DESCRIPTION

In computer security, a complex access control system may employ authorization, authentication, access approval, and audit steps to limit access to information. A simple access control system may employ fewer steps to limit information access. For example, a simple access control system may only cover access approval, whereby the system makes a decision to grant or reject an access request from an already authenticated subject, based on what the subject is authorized to access. Authentication and access control steps are often combined into a single operation, such that access is approved based on successful authentication, or based on an anonymous access token. Authentication methods and tokens can include passwords, biometric scans, physical keys, electronic keys and devices, hidden paths, social barriers, and monitoring by humans and automated systems.

In many traditional access control systems, electronic documents, such as textual data, e-mail messages, audio segments, video segments, electronic records, and other digital representations of information, have been protected from unauthorized access by restricting physical access to the digital data processing device containing such documents. However, this is often a cumbersome solution that is difficult to implement on a large scale, such as within a global corporation. Therefore, many access control systems are currently deployed within network based environments and require that users submit credentials for authentication prior to approving access to electronic documents of interest.

Access control systems deployed within network based environments mark documents and files as private or as having restricted access. A document or file with a private or restricted access marker will not be indexed or searchable, other than by those users which are allowed to access to the document. Access to such a document or file may be modified, but that often requires the user that created the document to manually access the document and modify the access criteria. The credentials of the user are normally compared with a security identifier, or a number or type of elements, in a pre-established access control list. The access control list associates a particular user or user group with a permission to perform an activity (e.g., read access, write access, deny access, etc.).

Access control lists can effectively restrict access to sensitive documents in networked environments within a particular organization or domain. However, access control lists incorporated into more structured environments, such as collaboration portals, can undesirably restrict access to the portal and hinder collaboration between users. More specifically, access control systems utilizing access control lists may not provide collaborating users the desired degree of access granularity regarding a specific electronic document of interest. For example, authorized users of a portal may desire that their counterparts have a more limited type of read access to certain sensitive documents or parts thereof, but may not want to entirely disable or block access to the documents or hide their existence. In addition, the circumstances which required a given document to have restricted access may have changed and the information contained in the document may be needed for general access, i.e., unrestricted access. Typically, such a change would require a re-classification of the document as unrestricted or would require an update made to multiple indexes that control access to the document.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
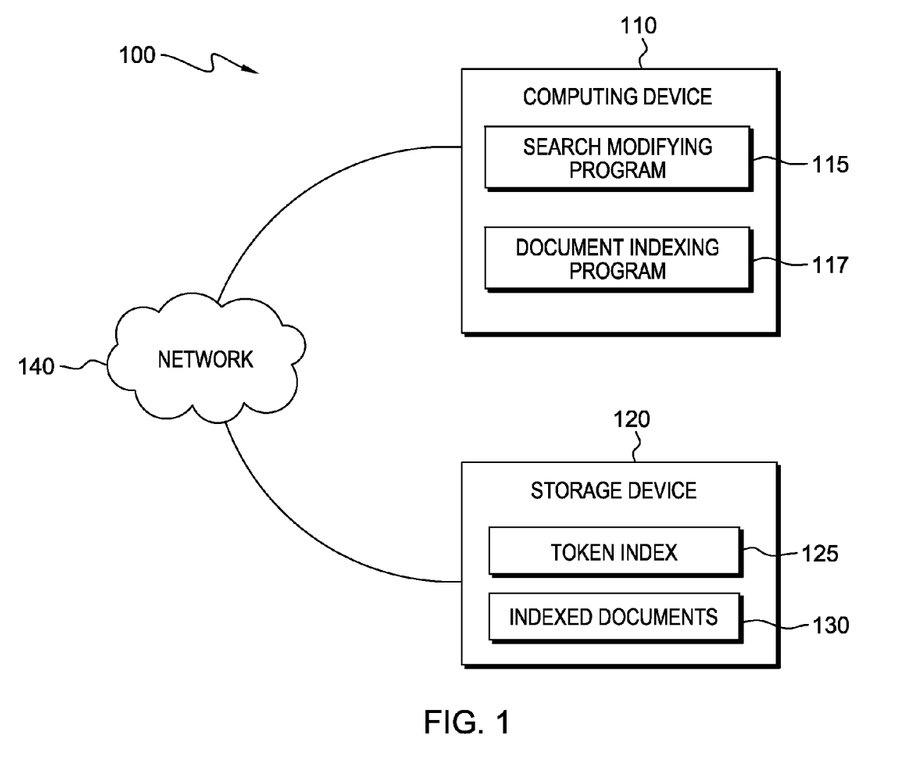
FIG. 1 is a functional block diagram illustrating an information access control environment, in accordance with an exemplary embodiment of the present invention.

The present invention will now be described in detail with reference to the Figures. FIG. 1 is a functional block diagram illustrating an information access control environment, generally designated 100, in accordance with one exemplary embodiment of the present invention.

Information access control environment 100 includes computing device 110 and storage device 120 connected via network 140. Computing device 110 includes search modifying program 115 and document indexing program 117. Storage device 120 includes token index 125 and indexed documents 130.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to search modifying program 115, document indexing program 117, token index 125, and indexed documents 130, and that is capable of running search modifying program 115 and document indexing program 117. Computing device 110 may include internal and external hardware components, as depicted and described in further detail with respect to FIG. 5.

In this exemplary embodiment, search modifying program 115 and document indexing program 117 are stored on computing device 110. However, in other embodiments, search modifying program 115 and document indexing program 117 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110 and storage device 120 in accordance with a desired embodiment of the present invention.

In various embodiments of the present invention, storage device 120 is a data storage device in communication with computing device 110. In general, storage device 120 is a data storage device used to store data, such as the data included in token index 125, and indexed documents 130. Typically, the data included in token index 125, and indexed documents 130 is accessed as needed by computing device 110 via network 140. In some embodiments, storage device 120 is integral with computing device 110. In some embodiments of the present invention, storage device 120 is a computing device that can be a standalone device, a server, a laptop computer, a tablet computer, a netbook computer, a personal computer (PC), or a desktop computer. In another embodiment, storage device 120 represents a computing system utilizing clustered computers and components to act as a single pool of seamless resources. In general, storage device 120 can be any computing device or a combination of devices with access to the data included in token index 125, and indexed documents 130, and that is capable of sending, via network 140, the information included in token index 125, and indexed documents 130 to computing device 110. Storage device 120 may include internal and external hardware components, as depicted and described in further detail with respect to FIG. 5.

In exemplary embodiments, search modifying program 115 includes programming to identify the types of fields included in encrypted search results as well as programming to determine a degree of authorization of a user initiating a search. For example, different types of fields included in encrypted search results can be identified using a variety of tags or flags that are associated with each given type of field. To identify the degree of authorization of a user initiating a search, search modifying program 115 uses identification, of the user initiating a search, to verify the degree of authorization of the user. The search can be thought of as occurring in two general steps. The first step is a document indexing and encryption step, which is provided by document indexing program 117. The second step is a search modification and execution step which is provided by search modifying program 115. A document is first indexed using encrypted tokens. Then, during a search, additional terms are added to a list of search terms based on the degree of authorization of the user conducting the search. The added search terms are typically encrypted tokens in most embodiments. In some embodiments, search modifying program 115 includes document indexing program 117, yielding a hybrid program that can execute the functions of both individual programs.

In exemplary embodiments, based on the determined degree of authorization of the user initiating a search, search modifying program 115 adds additional search terms to a list of search terms provided by a user, thereby generating a modified list of search terms. Based on the determined degree of authorization of the user initiating a search, search modifying program 115 also identifies the types of encrypted fields, which may be included in various search results, that the user is authorized to view. Search modifying program 115 then searches, using the identified types of encrypted fields and the modified list of search terms, to identify the search terms in the fields of the search results that the user is authorized to view. In certain embodiments, based on the degree of authorization of the user that initiated the search, search modifying program 115 then decrypts the types of encrypted fields, included in the returned search results, that the user is authorized to view and presents the now decrypted search results to the user.

In exemplary embodiments, a given search result can include two types of fields, namely public fields and private fields. A public field generally contains information that is not considered sensitive. As such, the public fields of returned search results are generally decrypted, if they have been encrypted, by search modifying program 115, before being presented to the user. Conversely, the private fields of returned search results contain information which is considered sensitive. Therefore, private fields are only decrypted, if they have been encrypted, by search modifying program 115, if the user that initiated the search has the required level of authorization to view those private fields. For example, a group of encrypted documents to be searched includes both public fields and private fields. The user initiating the search is only authorized to view public fields, therefore only search results including the search terms in the public fields are returned, with the public field decrypted. In other words, if a search result only includes a given search term in a field that the user is not authorized to view, then that search result is not returned to the user. In the case of a search result containing the search term in both a public and a private field, search modifying program 115 returns the search result with the public field being decrypted and the private field remaining encrypted, based on the authorization level of the user. It is to be noted that in some embodiments, there is no encrypted information included in either the public or private fields. In such a case, the contents of the private field is used to generate corresponding encrypted tokens that are then used to index the document. The search can then be performed using encrypted tokens that may identify that document.

In certain embodiments, if a user does not have authorization to view a given private field, then the occurrence of a search term in the private field of a search result will exclude that search result from being returned to the user. For example, a private field has three words, "regular", "silver", and "gold" that are used to indicate the account status of individuals. If a user without authorization to view the private field were to search for "regular", "silver", and "gold", then the search would only return results that include "regular", "silver", and "gold" in public fields, i.e., all results that include "regular", "silver", and "gold" in a private field(s) would not be returned as search results. However, if a user has authorization to view the private field(s) and the user were to search for "regular", "silver", and "gold", then the search results would include results that have "regular", "silver", and "gold" in either one or both of the public and private fields.

To create an encrypted search result, e.g., an encrypted document, at least some of the contents of a given search result are replaced, by document indexing program 117, with the tokens included in token index 125. By replacing search terms, e.g., words found in private fields, within a document with encrypted tokens, an encrypted document is generated that can include both encrypted and unencrypted content. Since an encrypted document can contain a public field, the encrypted document can contain both encrypted and non-encrypted tokens. However, private fields within a given encrypted document contain only encrypted tokens to limit the accessibility of sensitive information. A given encrypted search result is indexed, by document indexing program 117, based on the tokens and types of fields included in that encrypted search result. The indexed and encrypted search result is then saved as part of indexed documents 130. Search modifying program 115 identifies search results by searching the information stored in indexed documents 130. For further details regarding the encryption and indexing of a document see the discussion of FIG. 4.

A search term that has an associated encrypted token is herein referred to as a restricted search term. For example, "green" is a restricted search term because "green" occurs in a private field and is thus replaced with an encrypted token. A search term that does not have an associated encrypted token is herein referred to as a common search term, i.e., the non-encrypted token corresponding to a common search term is typically identical to the search term itself.

In exemplary embodiments, the search terms added to the list of search terms, by search modifying program 115, are related to an original search term in some way, e.g., synonyms. For example, a user initiates a search using the phrase "red ribbons". Search modifying program 115 identifies the original search terms to be "red", and "ribbon", and identifies the authorization level of the user. Search modifying program 115 then adds additional search terms to the search query using tokens included in token index 125. In this example, search modifying program 115 adds the terms "crimson", "scarlet", "cherry", "ruby", and "burgundy" as alternatives to the common search term "red". Search modifying program 115 also adds the terms "band", "strip", "tie", "trimming", and "decoration" as alternatives for the common search term "ribbon". Search modifying program 115 then uses the modified list of search terms to identify search results that include the search terms in the fields that the user is authorized to view. In certain embodiments, frequently used words are removed from the list of search terms, e.g. "the". This can reduce the number of number of returned search results that do not correspond to the subject being searched for. Search modifying program 115 can, in certain embodiments, then decrypt the contents of the fields using tokens included in token index 125, according to the degree of authorization of the user. The search results are then displayed for the user.

In this exemplary embodiment, decryption is applied to public and private fields, that have been encrypted, based on the level of authorization of a user. For example, a user without authorization searches using the search term "blueberry", which is a sensitive word included in a private field. A returned search result includes "blueberry" in both a private field and a public field. However, since the user lacks authorization to view the private field, the contents of the entire private field are shown as encrypted, e.g. the instance of "blueberry" in the private field is shown as encrypted. However, the instances of "blueberry" in the public field are shown as decrypted. Therefore, access control over the restricted field, and its contents, is maintained while providing user access to pertinent information included in the search result.

In exemplary embodiments, search modifying program 115 searches for restricted search terms by using the encrypted tokens, and additional search terms, that correlate to the original term. In other words, if a user has authorization to view certain restricted search terms, then search modifying program 115 adds, to the list of search terms, the restricted search terms and the corresponding encrypted tokens, when conducting searches. For example, if the user has authorization to view the restricted search term "socks", then search modifying program 115 identifies the encrypted version of "socks" to be "splkc", and uses "splkc" as a search term. Therefore, in the case of an encrypted document, search results that contain "splkc" in fields that the user is authorized to view are returned, and decrypted for the user to view, based on the user's degree of authorization.

In some embodiments, if a search is performed, by a user that lacks the required degree of authorization to view the private field, using a restricted search term, e.g., "sunny", and a common search term, e.g., "days", and the two search terms are explicitly connected by another term, for example, "sunny AND days", then the resulting search would return zero results because "days" only appears in the public fields. If however, the search is performed by the same user using a restricted search term that is not explicitly connected to an common term, e.g. "sunny, days", then the search would return results that include only the common search term "days" in the public fields.

In exemplary embodiments, token index 125 includes a list of tokens, e.g., terms and symbols, that are used to encrypt and decrypt documents, and to index documents. In general, a token is a sequence of characters that represents a search term. Some tokens are identical to an original search term, others are not, i.e., some are encrypted. For example, a data record for an individual includes public fields, specifically an address, a contact phone number, and the products shipped to that customer. The data record also includes a restricted field that indicates the account status of the individual. Since the account status can indicate the financial situation of the individual, the information included in the private field is considered sensitive and is therefore encrypted using encrypted tokens.

In this exemplary embodiment, the tokens included in token index 125 are used by search modifying program 115 to modify a list of terms by adding additional search terms to the list, which is then used by search modifying program 115 to execute a search (for further details regarding additional search term addition, see the description of search modifying program 115). The tokens are also used, by document indexing program 117, during the creation of and indexing of encrypted documents. Token index 125 includes both encrypted tokens as well as un-encrypted tokens which are used to represent various search terms. An un-encrypted token represents, in general, a word that is not sensitive, i.e., there is no degree of authorization associated with the search term. For example, the search term "doggy" is not considered a sensitive word by corporation XYZ, therefore the token for "doggy" is "doggy". However, a given search term can be represented by an encrypted token if that term is also an authorization limited term, i.e., there is a degree of authorization associated with the search term because that term occurs in a private field. For example, the term "green" is considered a sensitive word by corporation XYZ because it occurs in a restricted field. Therefore, the authorization limited term "green" is included in token index 125 along with an encrypted version of the term, e.g., "hfgtkbhkiujg".

In exemplary embodiments, the encrypted token associated with a restricted search term is not typically easy to associate with the un-encrypted version of the restricted search term. For example, the encrypted token for restricted search term "coffee" is "bxlkvdqnrts". A user seeing the term "bxlkvdqnrts" in a document would not usually be able to identify the un-encrypted version of the restricted search term to be "coffee". Thus, as search results are returned to a user, the user will not easily be able to identify what an encrypted token represents.

In exemplary embodiments, for highly sensitive search terms, e.g., search terms that are considered at high risk for data theft, token index 125 includes multiple encrypted tokens that can be used in place of the highly sensitive search terms. For example, the restricted search term "pancakes" has three different encrypted tokens that are alternately used to replace instances of "pancakes". This can increase the difficulty of using observation to identify a correlation between a given encrypted token and an original search term used for a search.

Given that certain words are often found in combination with each other, successful restriction of access to a given encrypted word is not always straight forward. Care must be exercised to select encrypted tokens that can not be easily matched to the original term. For example, a user without authorization to view private fields performs a search using the terms "blue" and "pants". The term "blue" does not occur in private fields but the term "pants" does. Therefore the user does not have authorization to view the term "pants" because "pants" is included in the private fields. A search returns several results that all include "blue pants" in the public fields as well as "dfhy" and "splkc" in the private fields of all the returned search results. The user may be able to determine that "dfhy" is the encrypted token for "blue" and that "splkc" is the encrypted token for "pants" based on the length of the entered search terms the proximity of the encrypted terms to one another.

In this exemplary embodiment, indexed documents 130 includes, in the case of encrypted documents, an index of the encrypted search results that have already been encrypted by document indexing program 117, i.e., tokenized, using the tokens included in token index 125. In certain embodiments, indexed documents 130 includes copies of unencrypted documents that have been indexed according to the contents of their respective public and private fields. Indexed documents 130, in this exemplary embodiment, also includes copies of the encrypted documents. In general, if an unencrypted document is received, then that document is encrypted and indexed using the tokens included in token index 125, before being saved as part of indexed documents 130. Typically, in the case of an encrypted document, a user identifies any restricted fields and sensitive terms included in common fields which must be encrypted. In some embodiments, search modifying program 115 includes additional programming and a set of rules that provide the required functionality for search modifying program 115 to identify and encrypt private fields and sensitive terms. In general, in the case of an encrypted document, the original search terms in a document, such as nouns, verbs, and adjectives, are identified and replaced by their corresponding tokens to generate an encrypted version of the document, which is then saved as part of indexed documents 130.

In certain exemplary embodiments, a given encrypted document is indexed using the tokens included in that encrypted document. For example, a document includes the terms "blue", "up", "down", and "sideways". The terms "up" and "down" are considered sensitive subject matter and are therefore subject to encryption. Therefore, all the instances of "up" and "down" included in the document are replaced with their respective encrypted tokens, e.g., "kdjv" and "ohrfjghb". The final version of the document, which is included in indexed documents 130, is then indexed with the terms "blue", "kdjv", "ohrfjghb" and "sideways". In this embodiment, the encrypted documents included in indexed documents 130 are already indexed. In certain embodiments, search modifying program 115 includes the needed additional programming to perform the aforementioned indexing process, before an encrypted document is saved as part of indexed documents 130.

Figure 2:
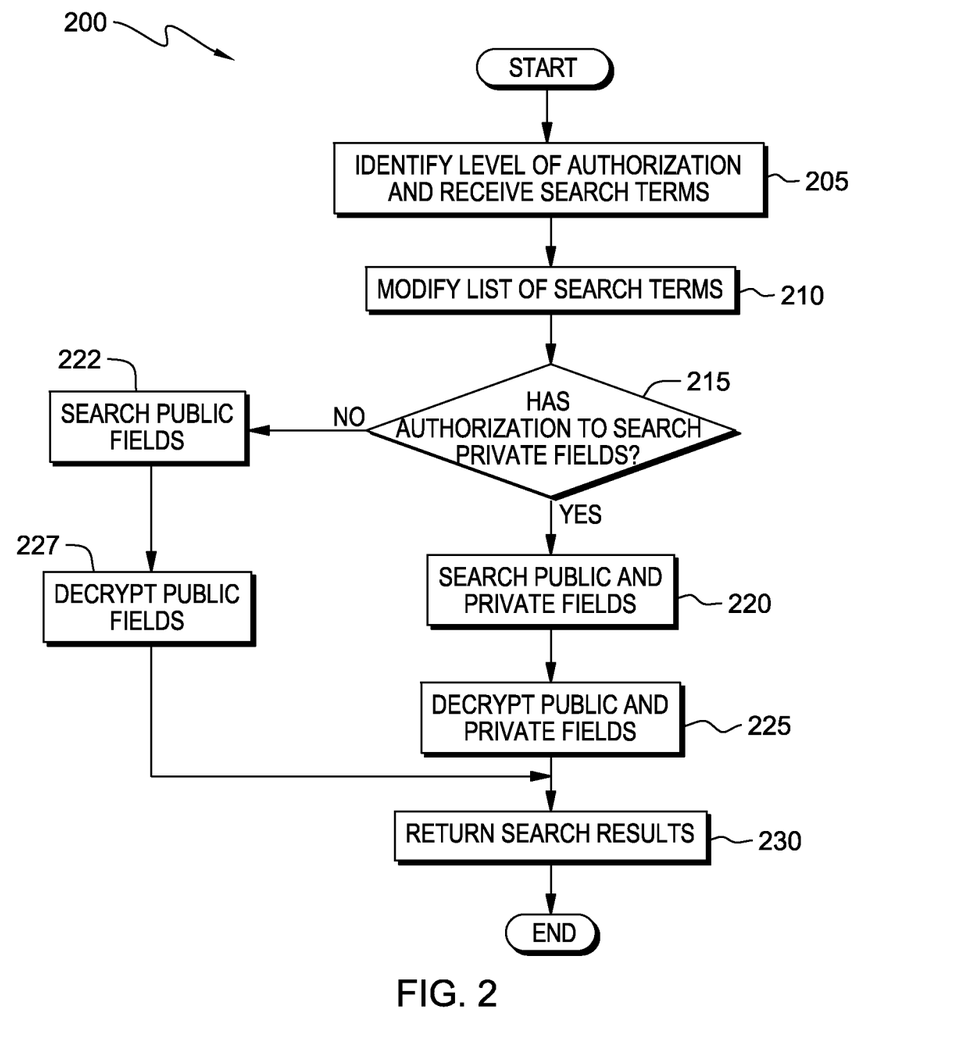
FIG. 2 illustrates operational steps of a search modifying program, on a computing device within the information access control environment of FIG. 1, in accordance with a first exemplary embodiment of the present invention.

FIG. 2 is a flow diagram, 200, illustrating the operational steps utilized by search modifying program 115 to modify both the search terms used for a search, and the results of the search, in accordance with a first exemplary embodiment.

In an exemplary embodiment, search modifying program 115 identifies a user and the user's associated level (or degree) of authorization along with an initial list of search terms, in step 205. The user provides identification information, e.g. signs in, and search modifying program 115 retrieves the authorization information pertaining to the user, specifically a list of fields the user has authorization to view. After receiving an initial list of search terms, which are provided by the user, search modifying program 115 compares the search terms included in the list to an index of tokens included in token index 125. For example, a user signs in and search modifying program 115 retrieves the authorization information of the user, which indicates that the user has a restricted level of authorization and is not authorized to view private fields. The user then enters a list of search terms and initiates a search. In step 210, in response to the initiation of a search, search modifying program 115 modifies the initial list of search terms by comparing the initial list of search terms to the index of tokens included in token index 125 and retrieving additional search terms, which are then added to the list of search terms. For example, a list of search terms includes the terms "rainy", "cloudy", and "day". Search modifying program 115 identifies a number of synonyms for "rainy", "cloudy", and "day" included in token index 125. Search modifying program 115 adds the synonyms to the initial list of search terms.

In an exemplary embodiment, search modifying program 115 determines if the user has the required authorization needed to allow search modifying program 115 to search private fields, in decision step 215. If the user has the required level of authorization needed to search private fields (decision step 215, yes branch), then search modifying program 115 proceeds to step 220. If the user does not have the required level of authorization needed for restricted terms (decision step 215, no branch), then search modifying program 115 proceeds to step 222.

In step 220, based on the user's level of authorization, search modifying program 115 proceeds to search both public and private fields of potential search results, included in indexed documents 130, using the modified list of search terms. Search results that include the search terms in public and private fields are identified and retrieved. For example, a search identifies three search results. The first search result only includes the search terms in a public field. The second search result only includes the search terms in a private field. Lastly, the third search result includes the search terms in both a public field and a private field. All three search results are retrieved by search modifying program 115.

In step 225, search modifying program 115 accesses the tokens included in token index 125 and decrypts the public and private fields of the retrieved search results. For example, a search result includes the term "kgujkhg" in both public and private fields. Search modifying program 115 accesses the tokens included in token index 125 and identifies the non-encrypted term "sticks" as corresponding to "kgujkhg". Search modifying program 115 then replaces all instances of "kgujkhg", occurring in both the public and private fields, with "sticks".

In step 222, based on the user's level of authorization, search modifying program 115 proceeds to search only the public fields of potential search results, included in indexed documents 130, using the modified list of search terms. Therefore, only the search results that include the search terms in public fields are identified and retrieved. In step 227, search modifying program 115 accesses the tokens included in token index 125 and decrypts the public fields of the retrieved search results. For example, a search result includes the term "jgrytupler" in a public field. Search modifying program 115 accesses the tokens included in token index 125 and identifies the non-encrypted term "grapes" as corresponding to "jgrytupler". Search modifying program 115 then replaces all instances of "jgrytupler", occurring in the public field, with "grapes".

In an exemplary embodiment, in step 230, search modifying program 115 returns and presents the now decrypted search results to the user.

In some embodiments, the inclusion of a search term in a private field that the user is unauthorized to view does not exclude a search result from being identified and retrieved. However, if a search result includes a private field that the user is not authorized to view, then that private field will not decrypted. In this manner, the number of returned search results can be increased while maintaining access control over private fields. For example, a document includes 2,000 words and of those words, 100 words included in the public field are encrypted, and 12 words included in a restricted field are encrypted. If a user did not have authorization to view the restricted field, then a search would return the document showing the 12 encrypted words of the private field and 1,988 unencrypted words of the private field, 100 of which were decrypted. In this way, access control is applied to the sensitive content included in the search result's private field while allowing access to the contents of the public field. If the user did have authorization to view the encrypted words, then the encrypted words are replaced, by search modifying program 115, with the corresponding unencrypted versions of those words; thereby allowing the user to understand all 2,000 words in both the public and private field.

In some embodiments, a user may need a certain degree of authorization to view, and perform searches using, a given search term. If a user attempts to perform a search using a restricted search term, e.g., a search term which the user does not have authorization to view and search with, then search modifying program 115 limits the addition of search terms accordingly. For example, a user working for corporation XYZ searches for the terms "green", "socks", but does not have authorization to view the term "socks" because "socks" is considered a sensitive term by corporation XYZ. Search modifying program 115 adds additional terms, to a list of search terms, correlating to the term "green" because the user has authorization to search with and view the term "green". However search modifying program 115 does not include additional terms correlating to the term "socks", or use the term "socks" itself as a search term, because the user does not have authorization to view the term "socks". In other words, if the user lacks authorization, then search modifying program 115 ignores any entered search terms which the user is not authorized to view and perform searches with.

In continuation with the previous embodiment, if a user does not have authorization to view and perform searches using a given search term, then a returned result including that term will include an encrypted token in place of that term. For example a user performs a search using the term "black". The returned result includes the restricted search term "blue". Since the user does not have authorization to view or perform searches using the term "blue" all instances of "blue" in the document are replaced with "ksdcg". However, if the user does have authorization to view the term "blue", then search modifying program 115 decrypts the instances of the restricted term to be displayed as "blue" in the returned search result. In some embodiments, if a user does not have authorization to view or perform searches using a given term, then any returned results will include a blank field, i.e. an empty field, in place of that search term. In yet other embodiments, a part of a given search result, e.g., an entire field, can be excluded from a returned search result if that part of the search result includes a restricted search term. For example, a paragraph in a fifty page document includes a highly restricted search term. A search result would be returned with the paragraph replaced, e.g., replaced by a blank field.

In one embodiment, the contents of public fields are not encrypted during the indexing phase while the contents of private fields, i.e. the tokens found in private fields, are encrypted before indexing. In such an embodiment, search terms are conditionally added based on the user's level of authorization. Note that the fields themselves are not encrypted but only the tokens found in the fields are encrypted prior to the indexing step, and the indexing step is performed on the encrypted tokens. In this embodiment, a given document is indexed based on the encrypted terms included in the private fields and the non-encrypted terms included in the public fields. If an unauthorized user performs a search, then the entirety of a given document will still be searched. However, because the list of search terms does not include the encrypted index terms, the returned results will not, generally, include documents with the search term in the private field. In such an embodiment, if a user has authorization to view a private field, then encrypted search terms are added to the list of search terms. If the user is not authorized to view private fields, then no search terms are added to the list of search terms. Note that no decryption step is needed in this embodiment since the contents of the document itself have not been encrypted. Only the indexed terms associated with the document have been encrypted.

Figure 3:
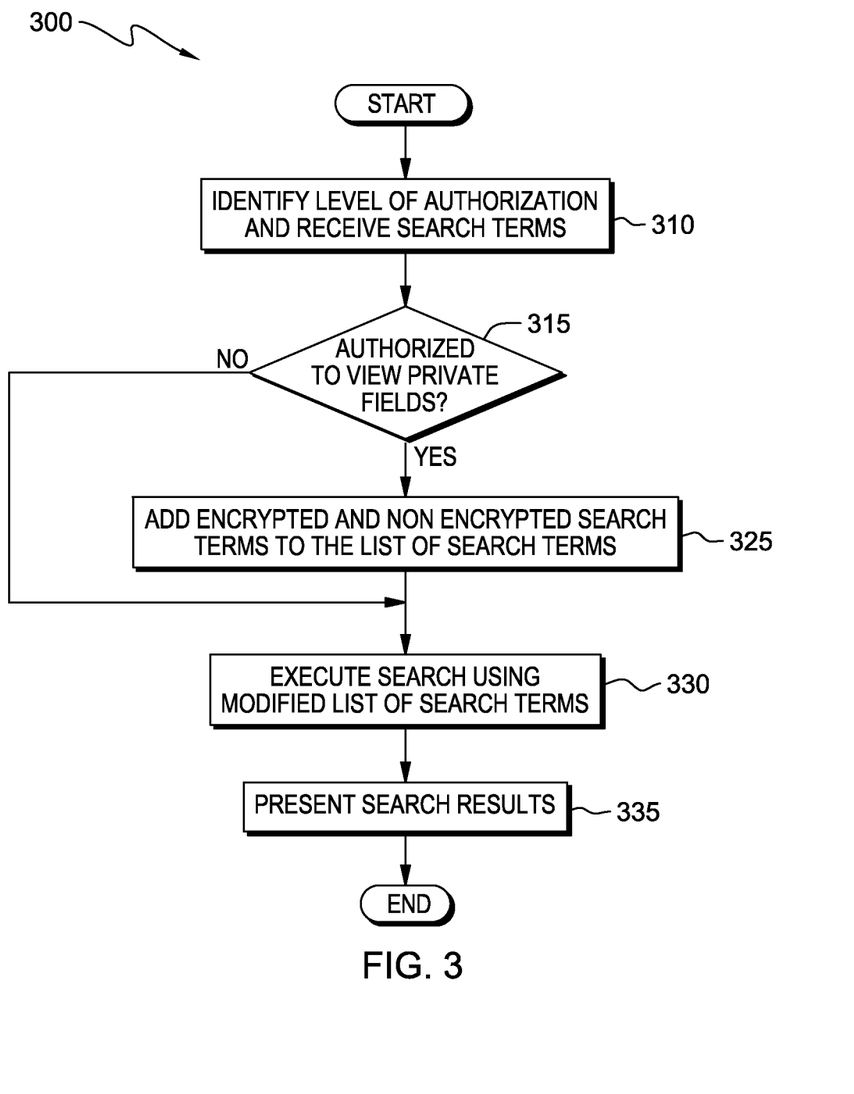
FIG. 3 illustrates operational steps of a search modifying program, on a computing device within the information access control environment of FIG. 1, in accordance with a second exemplary embodiment of the present invention.

FIG. 3 is a flow diagram, 300, illustrating the operational steps utilized by search modifying program 115 to index a document using encrypted tokens and modify both the search terms used for a search, in accordance with a second exemplary embodiment.

In step 310, search modifying program 115 identifies a user and the user's associated level (or degree) of authorization along with an initial list of search terms. The user provides identification information, e.g. signs in, and search modifying program 115 retrieves the authorization information pertaining to the user, specifically a list of fields the user has authorization to view.

In decision step 315, search modifying program 115 determines if the user has authorization to view private fields. If the user has authorization to view private fields (decision step 315, yes branch), then encrypted and non-encrypted search terms are added to the list of search terms, in step 325. If the user does not have authorization to view the private field (decision step 315, no branch), then search modifying program 115 proceeds to step 330. After the list of search terms has been modified, a search is executed using the modified list of search terms, in step 330, and the results of the search are presented, in step 335.

For example, clerk without authorization to view private fields sends the following search request "claim AND fraudulent", (i.e., the search terms are implicitly connected by AND). As the clerk has no privileges other than to see the public field, the search request is sent down to a search engine without modifications to include encrypted tokens. The result list returned by the search engine does not return any documents because the term "fraudulent" is not found in any of the common fields of the searched documents. As such, there are no documents that match both keywords. However, when a supervisor with authorization to view private fields sends the following search request "claim AND fraudulent", the search request is modified to be (claim OR pynvz) AND (fraudulent OR senhqhyrag). This modified request is sent down to the search engine and processed. Because "claim" and "senhqhyrag" are associated with a certain document, the modified search request evaluates to TRUE for the given document and the document is listed in the result list. Opening the document from the search result list allows the supervisor to see all fields without any encryption visible.

Figure 4:
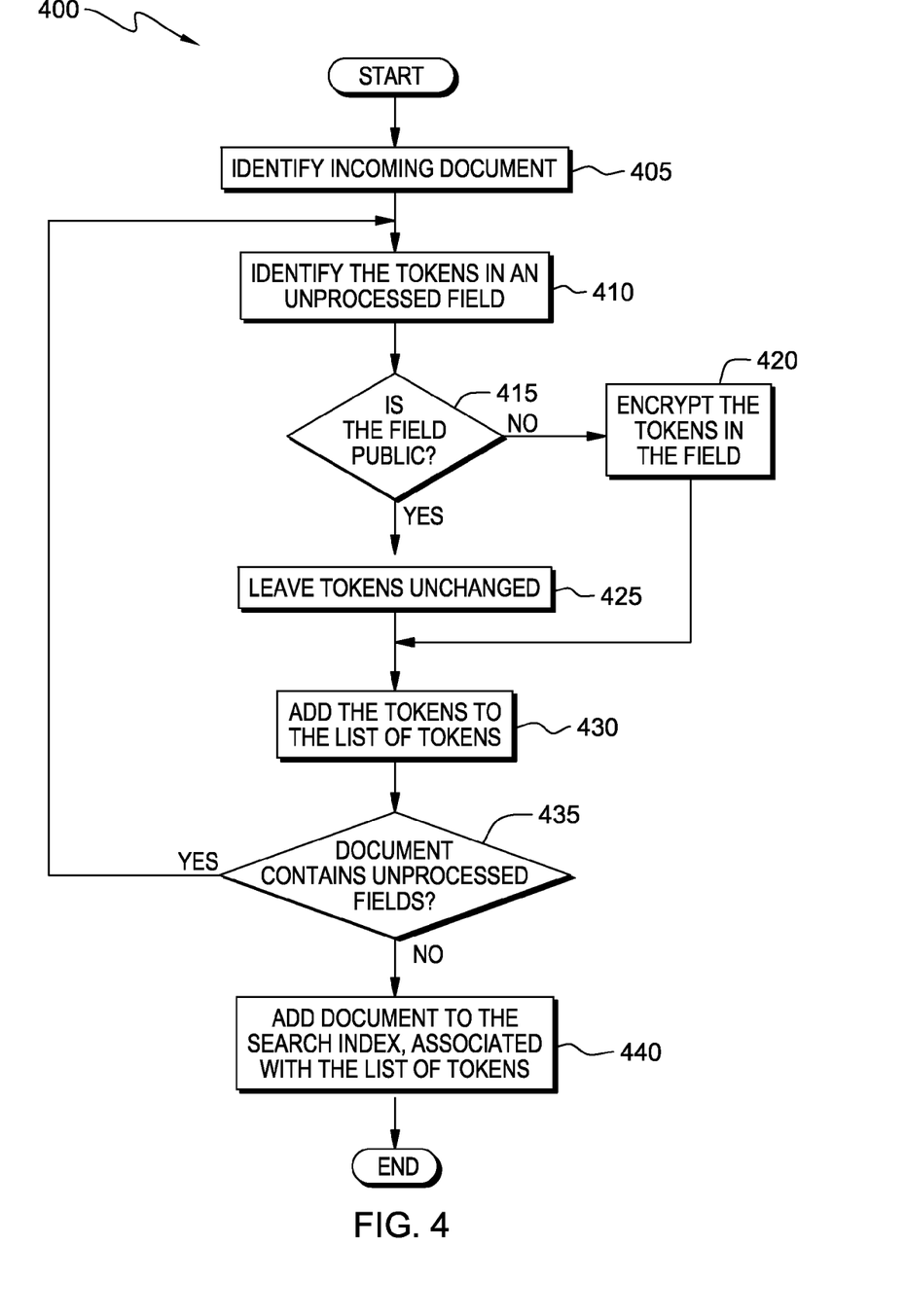
FIG. 4 illustrates operational steps of a document indexing program, on a computing device within the information access control environment of FIG. 1, in accordance with a second exemplary embodiment of the present invention.

FIG. 4 is a flow diagram, 400, illustrating the operational steps utilized by document indexing program 117 to generate and index a document using encrypted tokens.

In step 405, document indexing program 117 identifies an incoming document that has not been processed, i.e., that has not been indexed. An incoming document can be downloaded from, for example, a storage device. In other embodiments, as documents are created, those documents are sent to document indexing program 117 for encryption and indexing before being saved as part of indexed documents 130.

In step 410, document indexing program 117 identifies the tokens included in an unprocessed field of the document. Then in decision step 415, document indexing program 117 determines if that unprocessed field of the document is a public field. If the unprocessed field is a public field, then document indexing program 117 leaves the token unchanged, i.e., the tokens are not encrypted (decision step 415, yes branch). If the unprocessed field is not a public field, i.e., the field is a private field (decision step 415, no branch), then document indexing program 117 replaces the tokens in the field with their corresponding encrypted tokens, in step 420. However, the field itself is not encrypted.

In step 430, indexing program 117, adds the tokens, included in the field, to the list of tokens included in token index 125. If the tokens are encrypted, then the unencrypted versions of the tokens are removed from the list of tokens and the encrypted tokens are added to the list of tokens included in token index 125.

In decision step 435, document indexing program 117 determines if there are any remaining fields included in the document, which have not been processed, i.e., if the document contains unprocessed fields. If the document contains unprocessed fields (decision step 435, yes branch), then indexing program 117 returns to step 410, and identifies the tokens included in the unprocessed field. If the document does not contain unprocessed fields (decision step 435, no branch), then indexing program 117 proceeds to step 440 and adds the document to the search index, and associates the tokens, included in the document, to the document in the search index, i.e., the document is indexed based on the tokens included in the document. The document, and the search index, are saved as part of indexed documents 130. The indexed document is now ready for searching and retrieval by search modifying program 115.

For example, in a document, a public field contains the string "claim submitted" and a restricted field contains the string "fraudulent transaction assumed". The content of the public field is indexed as "claim" and "submitted". The tokens found in the private field are encrypted before being indexed. For example, the encryption method "rot13" is used to encrypt "fraudulent transaction assumed". (It is to be noted that "rot 13" is a simple encryption method that simply shifts the letters thirteen spaces. In most circumstances, a more complex encryption is used.) Therefore the private field is indexed as "senhqhyrag", "genafnpgvba", and "nffhzrq". The indexing therefore associates the following tokens to the document: "claim", "submitted", "senhqhyrag", "genafnpgvba", and "nffhzrq".

In certain embodiments, public and private fields do not contain encrypted words, e.g., tokens. In such an embodiment, private fields are shown as blank sections or are simply not displayed at all, for an unauthorized user. Conversely, public fields are shown in their entirety. If a user with authorization performs a search, then both the public and the private fields are searched. A search result, in this case, would display both public and private fields based on the user's authorization. If a user without authorization performs a search, then only the public fields are searched. A search result, in this case, would display public fields based on the user's authorization, but not private fields. Stored potential search results may include flags for the public and private fields. The flags could then be used to determine which fields to display to the user. For example, a user without authorization executes a search. The public fields of the potential search results would be identified, based on a certain flag, and be subsequently searched for instances of a search term. The private fields of the potential search results would also be identified, based on a different flag, but would not be searched or displayed. Returned search results would therefore include the search term in the public field. When the user views a given returned search result, only the fields which they are authorized to view, e.g. the public fields, are displayed.

In certain embodiments, the degree of decryption can be modified to correspond to multiple levels of authorization which control the addition of search terms. For example, there may be several levels of authorization that each correspond to different degrees of decryption. In other words, each level of authorization corresponds to a different degree of modification of the list of search terms as well as a different degree of decryption of search results.

Figure 5:
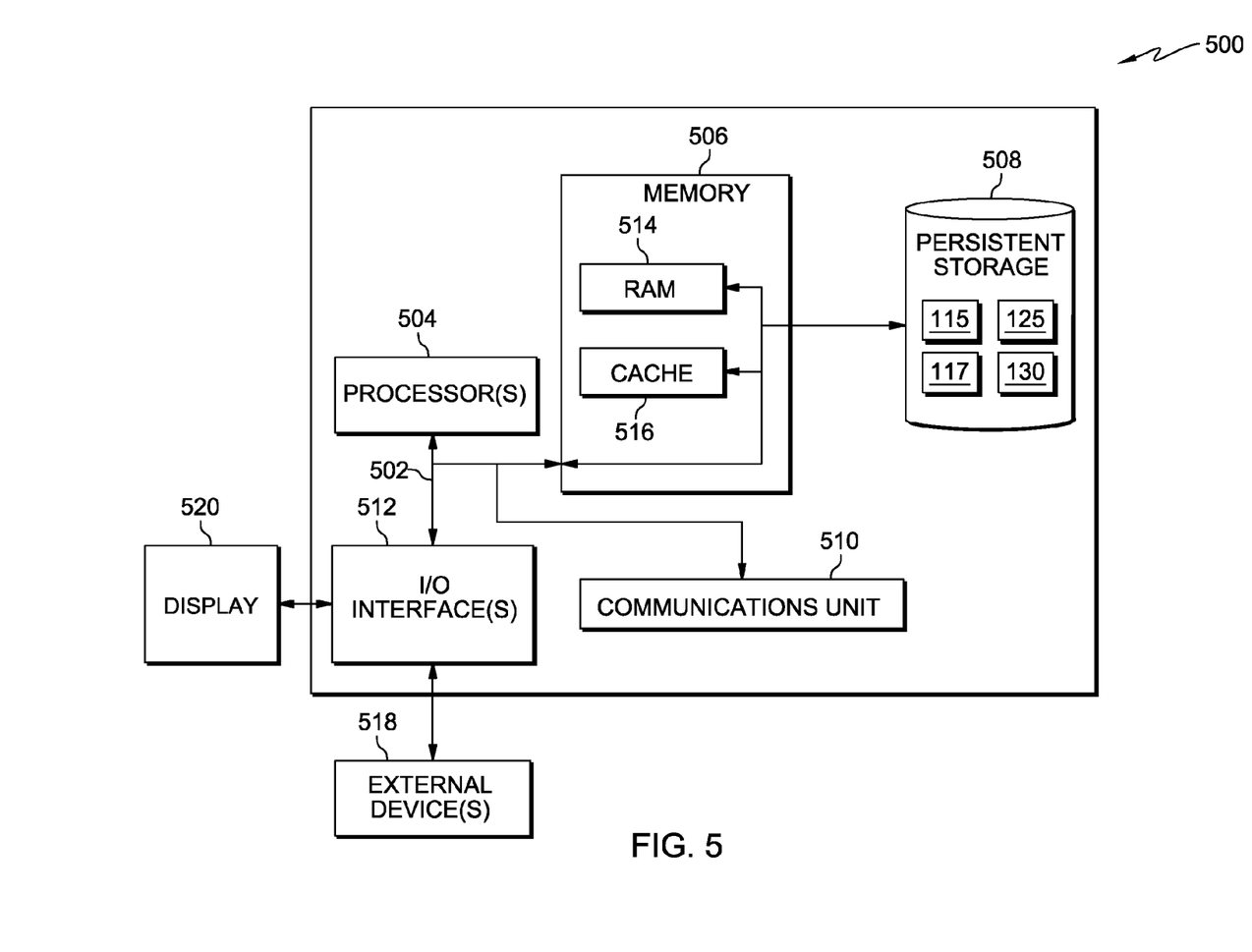
FIG. 5 depicts a block diagram of components of the computing device executing the search modifying program, in accordance with an exemplary embodiment of the present invention.

FIG. 5 depicts a block diagram, 500, of components of computing device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Search modifying program 115, document indexing program 117, token index 125, and indexed documents 130 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of storage device 120. In these examples, communications unit 510 includes one or more network interface cards. Communications unit 510 may provide communications through the use of either or both physical and wireless communications links. Search modifying program 115, document indexing program 117, token index 125, and indexed documents 130 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., search modifying program 115, document indexing program 117, token index 125, and indexed documents 130, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to control access to information, the method comprising:
computer hardware determining whether a first type of field of a first document has restricted access;
the computer hardware generating a modified list of index terms by encrypting tokens occurring in the first type of field using a first set of encryption settings;
the computer hardware executing an indexing step using the modified list of index terms;
the computer hardware generating a modified list of search terms by adding first additional search terms to a list of search terms, wherein the first additional terms include synonyms of the search terms and terms that are related to the search terms;
the computer hardware removing frequently used words from the modified list of search terms; and
responsive to a determination that a user has authorization to view the first type of field, the computer hardware adding to the modified list of search terms an encrypted version of a search term included in the list of search terms such that execution of a search using the modified list of search terms returns a result that identifies the first document as a search result when either an unencrypted or an encrypted version of a search term is found in the index terms associated with the first document.

2. The method of claim 1, the method further including:
the computer hardware determining whether the user has authorization to view the first type of field, based on a first degree of authorization of the user;
the computer hardware generating the modified list of search terms by adding second additional search terms to a list of search terms, based on the first degree of authorization of the user to view the first type of field, wherein the second additional search terms are encrypted search terms created using the first set of encryption settings;
the computer hardware executing a search using the modified list of search terms; and
the computer hardware identifying a search result based, at least in part, on the modified list of search terms.

3. The method of claim 1, the method further including:
the computer hardware determining that a second type of field of a second document has restricted access, based on a second degree of authorization of the user;
the computer hardware generating a modified list of index terms by encrypting one or more tokens occurring in the second type of field using a second set of encryption settings; and
the computer hardware executing an indexing step using the modified list of index terms.

4. The method of claim 3, the method further including:
the computer hardware determining, based on the second degree of authorization of the user, that the user is authorized to view the second type of field; and
the computer hardware generating the modified list of search terms by adding third additional search terms to the list of search terms, wherein the third additional search terms are created using the second set of encryption settings.

5. The method of claim 2, the method further including:
the computer hardware adding to an original list of search terms, a search term in encrypted form that corresponds a user provided search term, thereby generating the modified list of search terms; and
the computer hardware executing the search such that a document is identified as a search result when either an unencrypted or an encrypted version of a given search term is found in the index terms associated with that document.

6. The method of claim 2, wherein the step of the computer generating a modified list of search terms by adding second additional search terms to the list of search terms, based on the first degree of authorization of the user to view the first type of field includes one or more of the following:
the computer hardware searching for one or more synonyms of a search term included in the list of search terms;
the computer hardware searching for one or more terms that are related to the search term included in the list of search terms; and
the computer hardware generating a modified list of search terms by adding synonyms of the search term, terms that are related to the search term, and the encrypted versions of the search term to the list of search terms.

7. A method to control access to information, the method comprising:
computer hardware determining that a first type of field of a first document has restricted access;
the computer hardware generating a modified list of index terms by using a first set of encryption settings to encrypt one or more tokens included in the first type of field;
the computer hardware executing an indexing step using the modified list of index terms;
the computer hardware determining whether a user has authorization to view the first type of field based on a degree of authorization of the user;
the computer hardware generating a modified list of search terms by adding first additional search terms to a list of search terms, wherein the first additional terms include synonyms of the search terms;
the computer hardware removing frequently used words from the modified list of search terms;
responsive to a determination that the user has authorization to view the first type of field, the computer hardware adding to the modified list of search terms an encrypted version of a search term included in the list of search terms such that execution of a search using the modified list of search terms returns a result that identifies the first document as a search result when either an unencrypted or an encrypted version of that search term is found in the index terms associated with the first document;
the computer hardware executing a search using the modified list of search terms; and
the computer hardware identifying a first search result that includes the first type of field, wherein the first type of field of the first search result includes a search term that is included in the modified list of search terms.

8. The method of claim 7, the method further including:
the computer hardware determining, based on the degree of authorization of the user, that the user is authorized to view a second type of field; and
the computer hardware generating the modified list of search terms by adding second additional search terms to the list of search terms, wherein the second additional search terms further include one or both of encrypted search terms and encrypted document terms.

9. The method of claim 8, the method further including:
the computer hardware retrieving a second search result; and
the computer hardware decrypting the second type of field included in a second search result based on the degree of authorization of the user indicating the user is authorized to view the second type of field.

10. The method of claim 7, wherein the step of the computer generating a modified list of search terms by adding additional search terms to the list of search terms includes:
the computer hardware searching for one or more synonyms of a search term included in the list of search terms;
the computer hardware searching for one or more terms that are related to the search term included in the list of search terms; and
the computer hardware generating the modified list of search terms by adding one or more of synonyms of the search term, terms that are related to the search term, and the encrypted versions of the search term to the list of search terms.

11. The method of claim 9, wherein the step of the computer hardware decrypting the second type of field included in the second search result based on the degree of authorization of the user indicating the user is authorized to view the second type of field includes:
the computer hardware replacing, in the second search result, an encrypted search term with a decrypted version of that encrypted search term, wherein the encrypted search term is included in the second type of field.

12. The method of claim 7, the method further including:
the computer hardware determining a degree of authorization of the user to view a decrypted term that corresponds to an encrypted term included in a document, wherein the encrypted term included in the document is included in the first type of field; and
responsive to the determination that the user has authorization to view the decrypted term that corresponds to the encrypted term, the computer hardware replacing an instance of the encrypted term that appears in the first type of field of the document with the decrypted term.

13. The method of claim 7, wherein the step of the computer hardware executing the search using the modified list of search terms includes:
the computer hardware searching a single index to identify prospective search results that include at least one type of field, wherein the single index indexes prospective search results based, at least in part, on whether a prospective search result includes one or more of an encrypted search term, an encrypted document term, an unencrypted document term, and a type of field.

14. A method to control access to information, the method comprising:
computer hardware generating a modified list of index terms by encrypting one or more tokens occurring in a first type of field of a first document using a first set of encryption settings;
the computer hardware executing an indexing step using the modified list of index terms;
the computer hardware generating a modified list of search terms by adding to a list of search terms one or both of synonyms of the search terms and terms that are related to the search terms;
the computer hardware removing frequently used words from the modified list of search terms; and
responsive to a determination that a user has authorization to view the first type of field, the computer hardware adding to the modified list of search terms an encrypted version of a search term included in the list of search terms such that execution of a search using the modified list of search terms returns a result that identifies the first document as a search result when either an unencrypted or an encrypted version of that search term is found in the index terms associated with the first document.

15. The method of claim 14, the method further including:
the computer hardware executing a search using the modified list of search terms; and
the computer hardware identifying a search result based, at least in part, on the modified list of search terms.

16. The method of claim 14, the method further including:
a computer hardware determining that a second type of field of a second document has restricted access, based on a first degree of authorization of the user;
the computer hardware generating a modified list of index terms by encrypting one or more tokens occurring in the second type of field using a second set of encryption settings; and
the computer hardware executing an indexing step using the modified list of index terms.

17. The method of claim 16, the method further including:
the computer hardware determining, based on the first degree of authorization of the user, whether the user is authorized to view the second type of field; and
responsive to a determination that the user is authorized to view the second type of field, the computer hardware generating the modified list of search terms by adding first additional search terms to a list of search terms, wherein the first additional search terms are created using the second set of encryption settings.

18. The method of claim 14, the method further including:
a computer hardware determining that a user has authorization to view a first type of field, based on a second degree of authorization of the user; and
the computer hardware generating a modified list of search terms by adding second additional search terms to the list of search terms, based on the second degree of authorization of the user to view the first type of field, wherein the second additional search terms are encrypted search terms created using the first set of encryption settings.

19. The method of claim 18, the method further including:
the computer hardware adding to the list of search terms, a search term in encrypted form that corresponds a user provided search term, thereby generating, at least in part, the modified list of search terms.

20. The method of claim 18, wherein the computer generating a modified list of search terms by adding second additional search terms to the list of search terms, based on the second degree of authorization of the user to view the first type of field includes:
based on the second degree of authorization of a user, the computer hardware generating the modified list of search terms by adding to the list of search terms an encrypted version of an unencrypted search term included in the list of search terms.

* * * * *